Feb. 7, 1928.                                                                1,658,432
J. A. EDEN, JR
RUNNING GEAR FOR VEHICLES
Filed Sept. 4, 1923          5 Sheets-Sheet 2
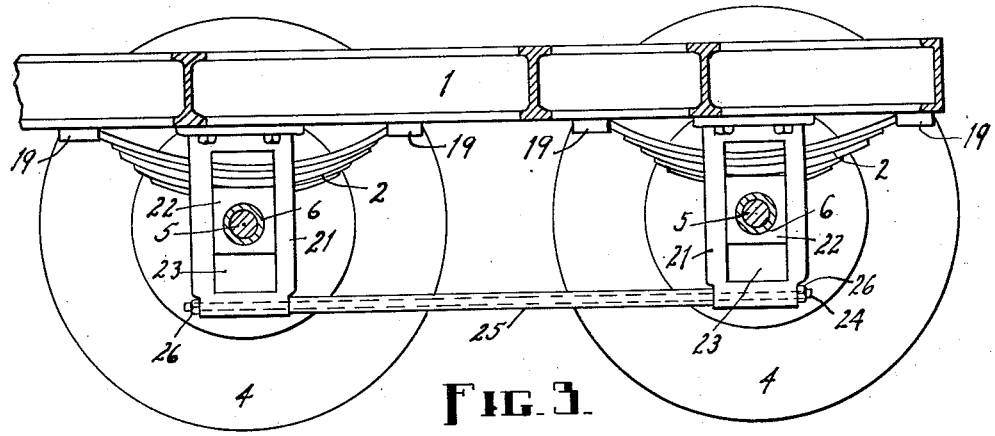
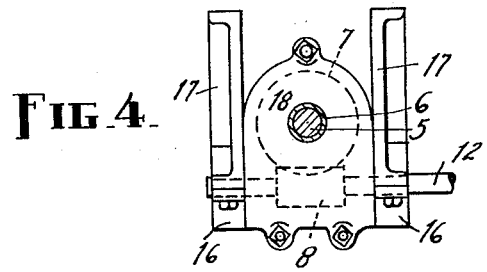
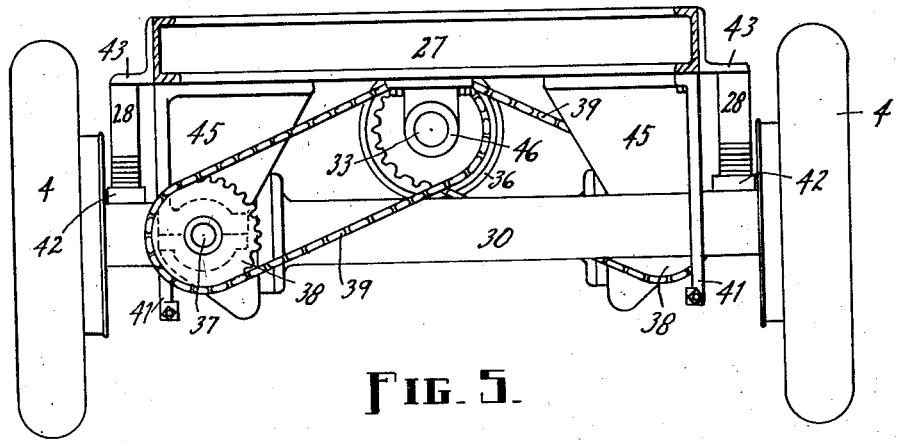
James A. Eden, Jr.,     INVENTOR.
BY
Frank A. Cutter,        ATTORNEY.

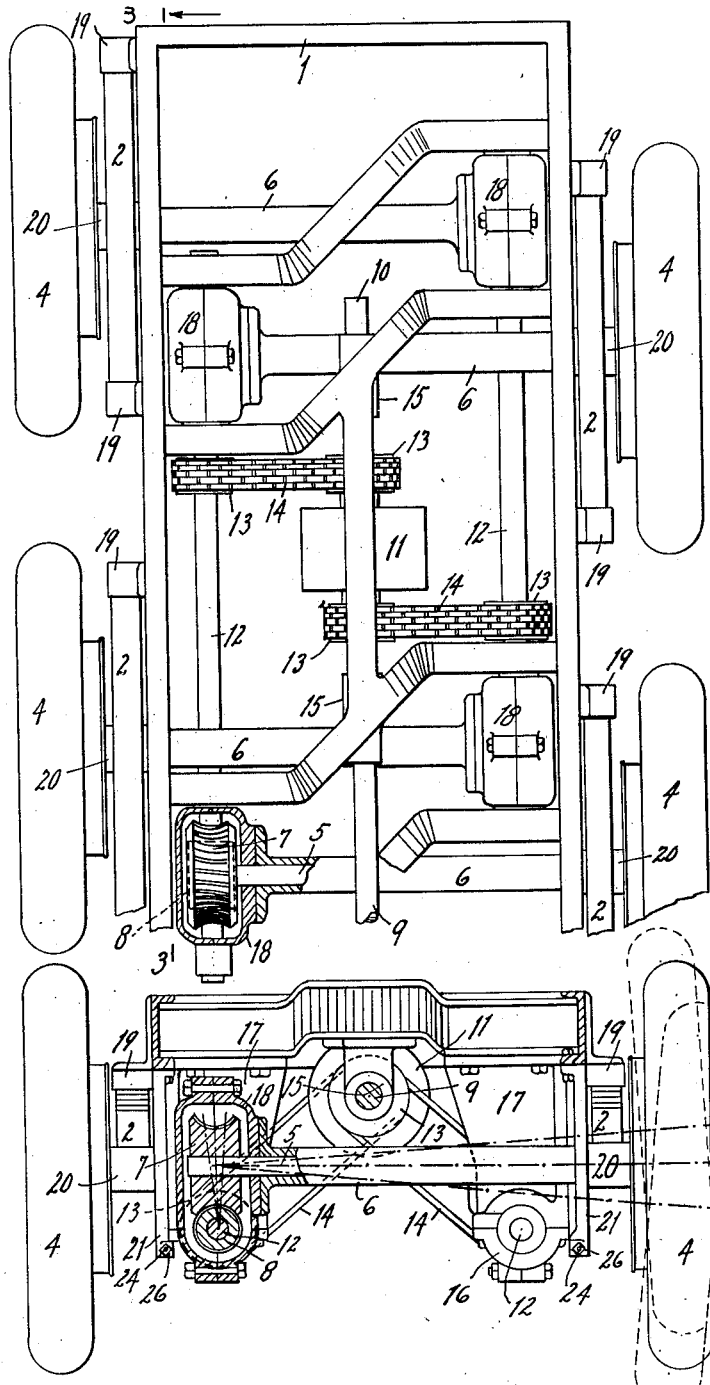

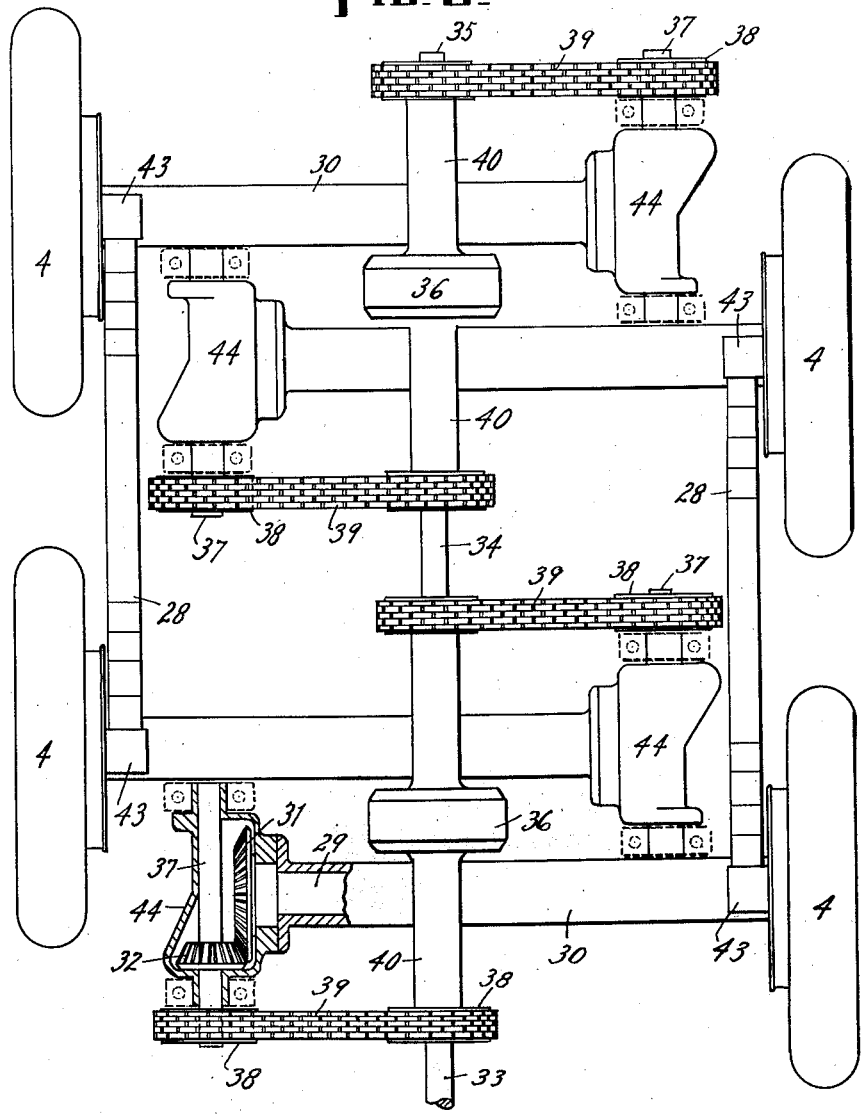

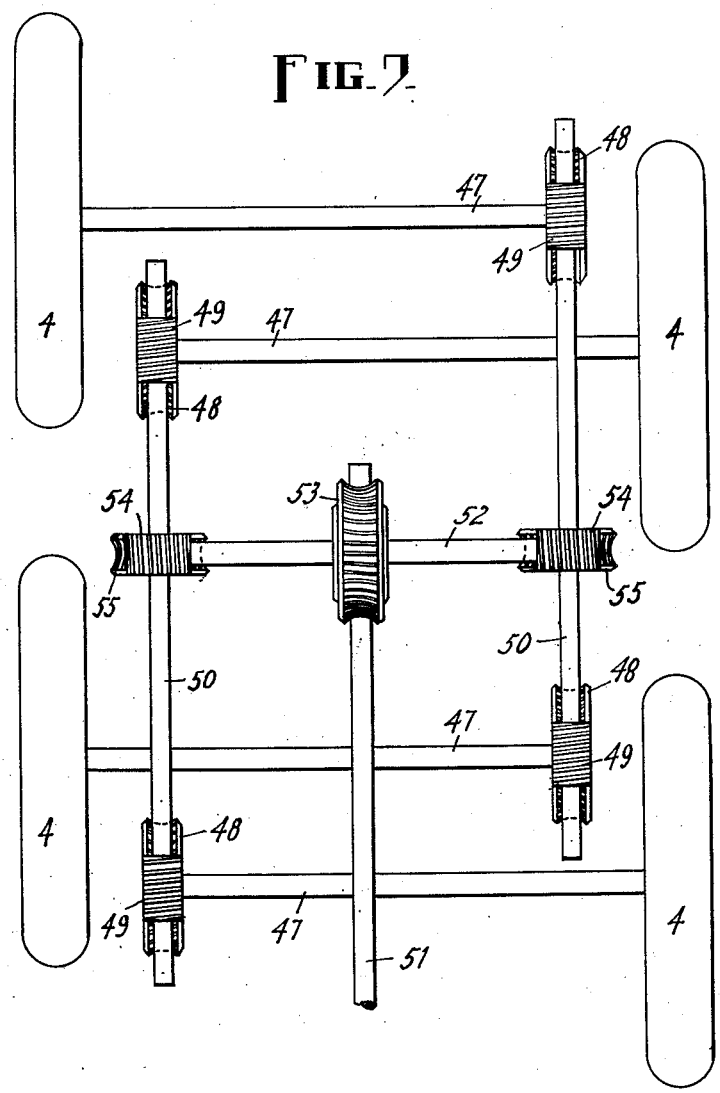

Feb. 7, 1928.
J. A. EDEN, JR
1,658,432
RUNNING GEAR FOR VEHICLES
Filed Sept. 4, 1923
5 Sheets-Sheet 5
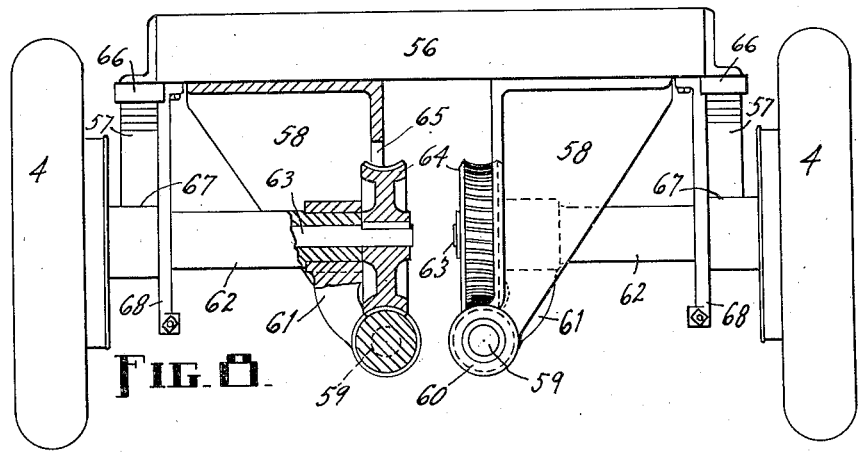
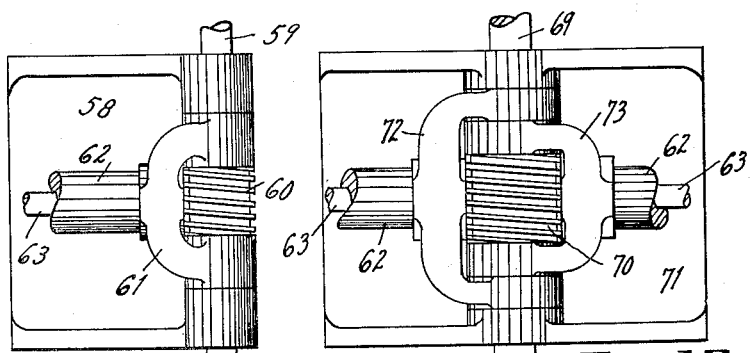
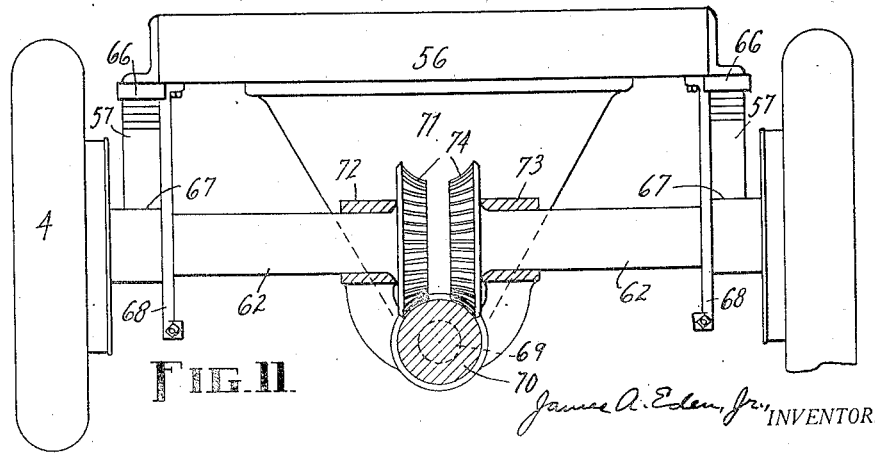

Patented Feb. 7, 1928.

1,658,432

UNITED STATES PATENT OFFICE.

JAMES A. EDEN, JR., OF SPRINGFIELD, MASSACHUSETTS.

RUNNING GEAR FOR VEHICLES.

Application filed September 4, 1923. Serial No. 660,767.

My invention relates to improvements in running-gear for vehicles and more especially for the rear ends of heavy, motor-driven trucks, and resides in a construction wherein an independent shaft or axle is provided for each driving, traction wheel, and such axle is driven separately or independently and has a greater or less amount of oscillatory movement about the axis of the driving element, in an approximately vertical plane, together with driving mechanism for such driving element, bearing, supporting, and guiding means for the axles and driving elements therefor, a frame or chassis, resilient supporting means for such chassis, and such other parts and members as may be necessary or desirable in order to make the running-gear complete and render the same practicable and efficient in every respect, all as hereinafter set forth.

In this running gear each axle is provided at one end with a driven worm member, gear, wheel, or other element, and at the other end with a supporting, driving, traction wheel for the vehicle.

Although my invention is especially designed for a vehicle or truck having six traction wheels four of which are driving wheels, it is also adaptable to a vehicle or truck having but two driving wheels.

The advantages of the four-wheel drive in a six-wheel truck are generally well understood, but it may be well briefly to point them out in connection with the objects of the present invention, inasmuch as the primary object of said invention is to enhance materially the value and utility of the four-wheel drive.

Four driving, traction wheels in a six-wheel vehicle, when said wheels are rendered capable of responding properly to the spring action of said vehicle, or the necessary corelation exists or cooperation takes place between said wheels and the vehicle springs, conform to the road, because two or more of said wheels are always in contact with the road, wherefore better traction is obtained and the vehicle travels with the minimum amount of vibration, that is, the load is carried without endangering or unduly disturbing its equilibrium. In such a vehicle the greater part of the weight is carried on the springs, consequently the tendency or liability to damage the road or injure the vehicle is greatly reduced, if not altogether eliminated. Larger or heavier loads can be safely carried on four rear wheels without damaging the road than on two rear wheels, and when the four wheels are on pneumatic tires the axles and axle parts can be comparatively light. The traction on the road of four rear wheels is, of course, greater than that of two rear wheels.

The conventional driving axle of a vehicle is driven from a shaft or chains, and the spring action of such vehicle has a constant tendency to produce varying conditions which result in an acceleration or retardation produced by the changing angle of the universal-joints in the one case, and the tightening and slackening of the two drive chains in the other case. In the present invention there is no change of operating conditions, hence all bearings can be fixed in alignment and all gearing or driving and driven elements for the axles enclosed in oil-tight cases, there being an entire absence of sliding shafts, sleeves, and universal-joints, and herein is found another important object or advantage.

A further object is to provide running-gear which permits all of the driving, traction wheels freely to conform to an uneven road without straining the vehicle frame, such result being obtained by carrying the axle of each wheel on a pivot which is the axis of the driving element for said axle, or, in other words, fulcruming such axle on such axis.

From the foregoing it is plainly to be seen that rigidity of structure is coupled with flexibility of action in my running-gear.

Still another object is to provide, in running-gear of the character described, axles for the driving, traction wheels, each of which axles is of a length equal to or in excess of one-half of the width of the vehicle that consists in part of said running-gear. In this case it is necessary usually that the axles for each pair of wheels be out of alignment with each other, and that said wheels be in staggered relationship, but such arrangement of the axles and wheels is in no sense a detrimental factor to the successful operation of the same.

The range of application of the present invention is wide, and the media through or by means of which said invention may be made effective are numerous, which are important advantages and enhance the value of said invention. At this point it may be well to observe that pratically no limit, within the range of possibilities, is to be imposed either in regard to the range of application of the invention or relative to the means by which the same is or may be made effective.

Other objects and advantages of this invention, not at this time more particularly specified, will be clearly evident from the following detailed description of said invention.

The objects of my invention may be attained and the advantages thereof secured by the means and mechanisms illustrated in the accompanying drawings, in which—

Figure 1 is a top plan, in partial section and with parts broken off, of a running-gear which embodies a practical form of my invention; Fig. 2, what may be termed a front end elevation of said running-gear, with parts in section; Fig. 3, a longitudinal, vertical section through said running-gear, taken on lines 3—3, looking in the direction of the associated arrow, in Fig. 1; Fig. 4, an inner edge elevation and an inner side elevation of the hangers or brackets and the worm case for one of the wheel axles; Fig. 5, what may be termed a front end elevation of a running-gear wherein are employed bevel-gears in place of worm members such as those used in the first example; Fig. 6, a top plan, in partial section, of the running-gear shown in Fig. 5; Fig. 7, a top plan of a modification of the running-gear illustrated in the first view; Fig. 8, an end elevation in partial section of a running-gear which embodies my invention, but wherein two wheel axles are in line with each other; Fig. 9, a bottom plan of the left-hand worm drive in the preceding view; Fig. 10, a bottom plan of the worm drive in Fig. 11, and Fig. 11, an end elevation, with parts in section and broken away, of a running-gear similar to that illustrated in Fig. 8, except that in the last view the aligning axles are driven from a single worm instead of from a pair of worms.

Similar reference characters designate similar parts throughout the several views.

The driving, traction wheels will hereinafter generally be referred to merely as traction wheels.

Referring first to Figs. 1, 2, 3, and 4, it will be seen that I have therein illustrated a running-gear which comprises the rear portion of a frame or chassis 1, two pairs of springs 2, two pairs of traction wheels 4, axles as 5 with housings as 6 for such wheels, worm-wheels as 7 secured to such axles, worms as 8 for such worm-wheels, horizontal, main driving or propeller shafts 9 and 10 connected by a differential represented or indicated at 11, two intermediate shafts 12 secured to which are said worms, said intermediate shafts being parallel with and on opposite sides of said propeller shafts, two sprocket-wheels 13 secured to said propeller shafts on opposite sides of said differential, two other sprocket-wheels 13 each secured on one of said intermediate shafts in line with one or the other of said first-named sprocket-wheels, a sprocket chain 14 connecting the sprocket-wheel on the shaft 9 with the sprocket-wheel on the right-hand shaft 12, and a sprocket-chain 14 connecting the sprocket-wheel on the shaft 10 with the sprocket-wheel on the left-hand shaft 12, and certain supporting, enclosing, and guiding means for the worm members and said axles, presently to be described. The shafts 9 and 10 with the differential 11 constitute parts of the propeller line of shafting, and they are located in the longitudinal, central, vertical plane of the running-gear. Such line of shafting need not differ materially from transmission mechanism in common use.

The four wheels 4 are of any approved construction, and may be assumed to be the driving, traction wheels of a six-wheel vehicle. Each wheel 4 is secured to one of the axles 5 at the outer terminal thereof, which axle is entirely separate from and independent of any other axle, and has secured thereto at the inner terminal thereof one of the worm-wheels 7. Each axle 5 extends inwardly from the wheel 4 thereon beyond the central, longitudinal, vertical plane of the running-gear, and the worm-wheel 7 on said axle is located thereby adjacent to the side of said running-gear which is opposite to that where said wheel is located. The axle is, therefore, of sufficient length for all practical purposes as will presently appear. It may be noted at this point, however, that, if the axle were too short, the amount of oscillatory movement required would impart or transmit altogether too much of a tilt to the wheel mounted on said axle. In order that the axles 5 shall be of sufficient length, it is usually necessary, unless the running-gear be very wide indeed, to arrange the axles 5 of a pair of wheels 4 one behind the other, and thus to locate said wheels in offset or staggered relationship, substantially in the manner shown in Fig. 1 and in certain of the other views.

The chassis 1 may be made up in any suitable or desirable manner, and the differential 11 or its case and bearings 15—15 for the propeller shafts 9 and 10 depend from and are supported by said chassis. Also supported by and depending from the chassis is a pair of hangers or brackets 17 adjacent to the inner end of each axle 5. One of the worms 8 at one end of each intermediate shaft 12 is located by said shaft directly beneath one of the worm-wheels 7, and these worm members intermesh with each other. Each worm 8 and its intermeshing worm-wheel 7 are enclosed in a case 18 which is received between the brackets 17 in one pair, such brackets being located in proper position to receive between them said case and support the same in front and behind. The terminal of the axle 5 on which the worm-wheel 7 is mounted passes through the inner side of the case 18, which side forms a bearing for such terminal, and one terminal of one of the shafts 12 passes through said case and the contiguous brackets 17. The lower portions of the brackets 17 together with underneath boxes 16 form bearings for the shafts 12. Each worm 8 is secured on that portion of one of the shafts 12 that is within the case 18 mounted on such shaft. Needless to say the shafts 12 are at right-angles to the axles 5.

It is clear from the foregoing that each shaft 12 when rotated drives two of the axles 5, through the medium of worms 8 on said shaft and the worm-wheels 7 on said axles, and that the axles driven are those for the wheels 4 which are on the same side of the chassis 1. It is also clear that the shafts 12 are driven in the same direction from the shafts 9 and 10, through the medium of the sprocket-wheels 13 and sprocket-chains 14. The differential 11, in the propeller line of shafting, functions in the usual manner to enable the traction wheels on the outside, when the running-gear is making a turn, to revolve faster than the traction wheels on the inside.

The springs 2 are of the ordinary leaf variety, and each is connected at the ends with recessed lugs 19 which extend outwardly from the bottoms of the sides of the chassis 1, there being two of such brackets for each spring. The type of spring and the mounting thereof are unimportant so far as the present invention is concerned. The four springs 2 are located above the four housings 6, crosswise thereof, and between the sides of the chassis 1 and the wheels 4. The central portion of each spring 2 bears on a seat 20 with which the housing 6 below is provided. The weight of the chassis and load which it carries is supported on the springs 2, and the latter are supported directly on the housings 6 and indirectly on the wheels 4. The housings 6 are of usual construction, and each extends between the wheel 4 at one end and the case 18 at the other end. The housings do not, of course, revolve.

As guides for the axles 5 with their housings 6 at the outer or wheel terminals, hangers or brackets 21 are secured to and depend from the bottoms of the sides of the chassis 1, inside of the springs 2, and blocks 22 are arranged to slide in vertical slots 23 in said brackets. The two brackets 21 which depend from each side of the chassis may be tied together and steadied or stayed at the bottom by means of a horizontal rod 24, a spacer sleeve 25 on said rod between said brackets, and nuts 26—26 on said rod in front of the front bracket and behind the rear bracket. The blocks 22 are rigidly attached to the housings 6.

The load is carried by the springs 2 on the housings 6 and axles 5 and the wheels 4, and as said load moves up and down the brackets 17 and the worms 8 with their shafts 12 and the cases 18 are carried with it, consequently said cases are rocked on said shafts, the worm wheels 7 rocking or slipping transversely on said worms, and the angles of the axles 5 are changed, but ordinarily such change is negligible.

When any wheel 4 arrives individually at a depression in the road, said wheel is permitted to descend into the same without affecting any of the other wheels 4, because the axle 5 of the descending wheel is enabled to tilt downwardly by the simultaneous rocking movement in one direction of the connected case 18, between the contiguous brackets 17, and the lateral sliding movement in one direction of the worm-wheel 7 on the worm 8 in said case, or the movement of said worm-wheel in one direction on said worm circumferentially of the latter; and, when any wheel 4 arrives individually at an obstruction in or raised part of the road, it is permitted to ride over the same without affecting any of the other wheels 4, because the axle 5 of the ascending wheel is enabled to tilt upwardly by the simultaneous rocking movement in the other direction of the connected case 18, between the contiguous brackets 17, and the movement of the worm-wheel 7 in the other direction on the worm 8 circumferentially of the latter—see broken lines in Fig. 2. The traction wheel during either of the actions just described is tilted in proportion to the amount of inclination of its axle, inasmuch as said wheel is fast to said axle and at right-angles thereto. When the traction wheel rides out of the depression or descends from the elevation, the axle, case, and worm-wheel resume their former positions. Normally the axles 5 are approximately horizontal and the worm-wheels 7 are approximately at right-angles to the horizontal planes of the axes of the worms 8. The spring 2, which bears on the housing 6 on the axle 5 that is tilted, expands and contracts to accommodate itself and the load to the changing positions in a vertical plane of said axle. It follows, therefore, that, as the running-gear proceeds along the road, the four traction wheels are always in driving contact with the road regardless of the unevenness of the same. The advantage of this condition is obvious.

From the foregoing it is evident that each axle, through the medium of its worm-wheel and case, is fulcrumed on the worm with which said worm-wheel intermeshes, and the worm axis, and therefore capable of oscillation in a vertical plane; also that said axle is directly driven independently by said worm and worm-wheel; furthermore, that the load at all times is maintained in a plane or planes which are approximately parallel with the plane beneath the four traction wheels when the latter are normally disposed.

The running-gear illustrated in Figs. 5 and 6 comprises the rear portion of a chassis 27, which is omitted from Fig. 6, a single pair of springs 28, two pairs of traction wheels 4, axles as 29 with housings as 30 for said wheels, bevel-gears as 31 secured to said axles at the inner ends thereof, said traction wheels being secured to said axles at the outer ends thereof, bevel-gears as 32 which intermesh with said first-named bevel-gears, the rear portion of a propeller line of shafting comprising shafts 33, 34, and 35, and two differentials represented at 36—36, one of said differentials connecting the shafts 33 and 34, and the other connecting the shafts 34 and 35, four, horizontal, intermediate shafts 37 upon which said bevel-gears 32 are secured, four sprocket-wheels 38 secured to said propeller shafts and the same number of sprocket-wheels 38 secured to the shafts 37 in line with said first-named sprocket-wheels, sprocket-chains 39 for said sprocket-wheels, and supporting, enclosing, and guiding parts and members hereinafter described. The differentials 36 are similar to the differential 1. The intermediate shafts 37 are parallel with the propeller shafts and located adjacent to the inner ends of the axles 29, being at right-angles to in the same horizontal plane, approximately with said axles when the latter are horizontally and normally disposed. There are two sprocket-wheels 38 on the shaft 34 and there is a single sprocket-wheel on each of the shafts 33 and 35. The sprocket-chains 39 respectively connect the sprocket-wheel on the shaft 33 with the sprocket-wheel on the front left-hand shaft 37, the front sprocket-wheel on the shaft 34 with the sprocket-wheel on the front right-hand shaft 37, the rear sprocket-wheel on the shaft 34 with the sprocket-wheel on the rear left-hand shaft 37, and the sprocket-wheel on the shaft 35 with the sprocket-wheel on the rear right-hand shaft 37. Housings are shown at 40 for the propeller shafts. In the main this construction is similar to that first described, but here bevel-gears are employed in place of worm members for driving the traction-wheel axles and providing the necessary fulcrum points therefor, and there is an individual shaft for each driving bevel-gear. Guiding brackets 41, similar to the brackets 21, are provided for the outer terminal portions of the axle housings 30. There is but one spring 28 on each side of this running-gear, and the same has its ends connected with recessed lugs 42—42 on the housings 30 which enclose the axles 29 that carry the two wheels 4 on the same side with the spring, and a lug 43 extends outwardly from the corresponding side of the chassis 27 above to bear on such spring intermediate of its ends. The springs 28 have their concavities underneath instead of on top as do the springs 2.

Each shaft 37 is journaled in a case 44, the bevel-gear 32 on said shaft and the axle bevel-gear 31 which intermeshes with said first-named bevel-gear are enclosed in said case, and the latter is journaled in a pair of brackets 45, which brackets are attached to and depend from the chassis 27. Each case 44 is, therefore, capable of being rocked in the supporting brackets 45 therefor, and the bevel-gear 31 in said case of being moved on the bevel-gear 32 in said case, whenever the axle 29 on which said first-named bevel-gear is mounted in tilted or oscillated, such movement of the bevel-gear 31 on the bevel-gear 32 being incident to the swinging of the axis of said first-named bevel-gear about the axis of said second-named bevel-gear, or the rocking of said first-named axis on said second-named axis, all substantially in the same manner as in the first case.

The foremost bracket 45, of the pair which supports each of the left-hand cases 44, is between the case and the sprocket-wheel 38 on the shaft 37 which is journaled in said case, and the rearmost bracket 45, of the pair which supports each of the right-hand cases 44, is between the last-named case and the sprocket-wheel 38 that is on the shaft 37 which is journaled in said last-named case.

The propeller shafts and differentials 36 are suitably supported beneath the chassis 27, in the longitudinal, central, vertical plane of the running-gear, one of the supporting brackets or hangers for one of said shafts appearing at 46 in Fig. 5.

The propeller shafts 33, 34, and 35 drive all of the intermediate shafts 37 in the same direction through the medium of the sprocket-wheels 38 and the sprocket-chains 39, the differentials 36 affording the necessary elasticity in the driving mechanism to enable the wheels 4 properly to function when the running-gear is making a turn, in exactly the same manner as is common to all running-gears which are provided with differentials. Two differentials are required here because the propeller shafts drive separate intermediate shafts for the wheels 4, one such shaft for each wheel, instead of driving a single intermediate shaft for two wheels on each side of the running-gear.

The operation of the running-gear just described, wherein bevel-gears are employed in connection with each axle, is substantially the same as that wherein worm members are employed with each axle, hence a more detailed explanation of said operation is not necessary.

In the Fig. 7 construction, the power is transmitted through a combination worm-drive and differential and a transverse shaft to the intermediate driving shafts, otherwise the running-gear therein illustrated is similar to the first example, or might be made to correspond with the second example. Four traction wheels 4 are here present as in the other two examples, and each is at the outer end of an axle 47 which carries at its inner end a worm-wheel 48. The two worm-wheels 48 on a side intermesh with two worms 49 secured to an intermediate shaft 50. The driving worms here are above the driven worm-wheels, while in the first case this order is reversed. There are two shafts 50 and intermediate of and parallel with the same is a main driving or propeller shaft 51. The propeller shaft 51 is connected with and drives a transverse shaft 52 through the medium of the well-known form of combination worm-drive and differential, the latter with its exterior worm-wheel being represented at 53. The shaft 52 is at right-angles to the shafts 50 and 51, and drives said shafts 50 through the medium of worms 54—54 secured to said shaft 52 at the ends thereof, and intermeshing worm-wheels 55 secured to said shafts 50.

The propeller shaft 51 drives the shaft 52 and the worms 54 thereon, said worms drive the worm-wheels 55, the shafts 50, and the worms 49 on said last-named shafts, and said last-named worms drive the worm-gears 48, the axles 47, and the wheels 4. A separate and independent drive is provided for each axle 47, and said axle is tilted or oscillated in a vertical plane, fulcruming with its worm-wheel 48 on the intermeshing worm 49, in a manner similar to that hereinbefore very fully explained.

The construction shown in Figs. 8 and 9 is an example of the application of my independently-driven and oscillatory axle feature applied to running-gear wherein the axles of a pair of wheels are in line with each other. This may also serve as an example of running-gear wherein there is but a single pair of traction wheels.

A chassis is represented at 56, a pair of wheels at 4, a pair of springs at 57, and a pair of supporting brackets at 58. Journaled in the brackets 58 are a pair of driving or propeller shafts 59 with a pair of worms 60 secured thereon. Mounted to oscillate on each shaft 59 is a bearing 61 for a housing 62 of an axle 63, at the outer end of which axle is one of the wheels 4. The upper terminals of the bearings 61 are mounted on or secured to the inner terminals of the housings 62. Secured to the inner terminal of the axle 63 is a worm-wheel 64, such worm-wheel being inside of the oscillatory bearing 61 and intermeshing with the worm 60 below. Each bracket 58 is slotted at 65 to receive the worm-wheel 64 and the parts below which are supported by said bracket. The springs 57 have their terminals engaged with hollow bearings 66—66 bracketed to the sides of the chassis 56, the intermediate portions of said springs are seated on lugs 67—67 on the housings 62, and there is a pair of guiding brackets 68 for said housings, all substantially as in the first construction.

The axles 63 are driven by the shafts 59 through the medium of the worms 60 and the worm-wheels 64, and either of said axles may be tilted in a vertical plane with the driving worm therefor as a fulcrum, inasmuch as the worm-wheel 64 on said axle is capable of being rocked and slipped laterally on said worm, and the bearing 61 for the housing 62 on said axle is capable of being rocked on the shaft 59 upon which said bearing is mounted. If the width of the running-gear be not so narrow as to render the axles 63 so short as to cause the wheels 4 carried thereby to be tilted at too sharp an angle under certain conditions, the construction last described is practicable, and might be deemed to be particularly desirable because both axles are located in line with each other or in the same vertical plane.

As shown in Fig. 9, each bearing 61 is bifurcated at the bottom to form hubs which are mounted on one of the shafts 59, one of the worms 60 is between such hubs, and the supporting bracket 58 is provided at the bottom with bearings to receive such shaft, the bracket bearings being outside of the bearings hubs.

Generally similar elements are present in the Figs. 10 and 11 construction as are present in the Figs. 8 and 9 construction, except that there is a single driving or propeller shaft, as 69, with a single worm, as 70 thereon, in place of the two shafts 59 and the two worms 60, in the other case; also a single bracket 71 takes the place of the two brackets 58, there are two bearings 72 and 73 which differ somewhat from the bearings 61, and there are two slightly different worm-wheels 74 which intermesh with the worm 70. The bracket 71 is provided at the bottom with bearings for the shaft 70, the oscillatory bearings 72 and 73 have hubs which are mounted on said shaft, and the worm 70 is between the hubs of the bearings 73. The worm-wheels 74 are secured on the inner terminals of the axles 63 of the construction now under consideration, and the upper terminals of the bearings 72 and 73 are mounted on or engaged with the inner terminals of the housings 62 of said construction, said worm-wheels being inside of said bearings and inner housing terminals.

The shaft 69, through the medium of its worm 70, drives both worm-wheels 74 and thus rotates the axles 63 upon which said worm-wheels are mounted, and either of said axles can be tilted or oscillated in a vertical plane with said worm as a fulcrum, since the worm-wheel mounted on such axle then rocks and slips laterally on said worm, and the associated bearing (72 or 73) rocks on said shaft.

Obviously the space between the worm-wheels 64 must be sufficient to enable either or both of said worm-wheels to be carried inwardly or towards the other or each other, when either or both axles 63 are tilted upwardly, to the required extent without interference or contact between said worm-wheels, and the same thing is true in regard to the worm-wheels 74.

It is conceivable that more than four, as well as less than four, oscillatory axles with their traction wheels and other parts and members might be employed in a single vehicle.

Necessarily, when any axle is tilted in the direction to carry its worm-wheel or other driven member in the direction of rotation of the engaging worm or other driving member, the speed of the revolution of said axle is slightly and momentarily decreased or retarded, and, when such axle is tilted in the direction to carry said worm-wheel or other driven member in the opposite direction or against the rotation of said worm or other driving member, said speed is slightly and momentarily increased or accelerated, but these speed changes in practice are not perceptible and have no affect practically on the successful operation of the running-gear.

What I claim as my invention, and desire to secure by Letters Patent, is—

1. In a running-gear for vehicles, a longitudinal shaft carrying a driving gear, an axle, a traction wheel and a driven gear secured to said axle at opposite terminals, a second longitudinal shaft carrying a gear driven from said driving gear, and also carrying a gear to drive said gear on said axle, and means to permit said axle to oscillate about the axis of the driving gear on said second shaft.

2. In a running-gear for vehicles, independent axles extending from opposite directions beyond the longitudinal center of the vehicle, traction wheels and driven elements secured to said axles at opposite terminals, driving elements for said driven elements, and means to permit said axles to oscillate in approximately vertical planes about the axes of said driving elements.

3. In a running-gear for vehicles, driving means for axles, a plurality of axles arranged to oscillate on the axes of said driving means, the outer ends of certain of said axles being on one side and such ends of other of said axles being on the other side of the vehicle, a traction wheel on each of said axles, a differential, and means to actuate said driving means so as to drive two or more of the traction wheels from one side and two or more of said wheels from the other side of said differential.

4. In a running-gear for vehicles, driving means for axles, a plurality of pairs of axles arranged to oscillate on the axes of said driving means, traction wheels on said axles, a differential, and means to actuate said driving means so as to drive each pair of said axles separately from said differential.

5. In a running-gear for vehicles, a differential, traction wheels, axles for said wheels, said axles being arranged in pairs on opposite sides of said differential, and means to drive said axles in such pairs from said differential, said means consisting in part of driving elements supported from the frame of the vehicle and driven elements carried by said axles, and adapted to permit said axles to swing radially about the axes of said first-named elements.

6. In a running-gear for vehicles, a differential, two shafts, means to drive said shafts from said differential, traction wheels, axles for said wheels, and means to drive said axles, said means comprising driving elements mounted on said shafts, and driven elements carried by said axles, and adapted to permit said axles to swing radially about the axes of said first-named elements.

7. In a running-gear for vehicles, independent axles arranged out of alignment with each other and extending from opposite directions beyond the longitudinal center of the vehicle, traction wheels carried by said axles, driven elements also carried by said axles, and means to drive said elements, the latter being so arranged that said axles swing on the axes of such driving means.

8. In a running-gear for vehicles, an axle, a traction wheel and a driven element secured to said axle at opposite terminals, and a driving element for said driven element, the axis of said driving element being between the lower tread point of said wheel and the center of said axle, and the latter swinging on said axis.

9. In a running-gear for vehicles, a frame, oscillatory cases supported from said frame in offset relationship laterally of the vehicle, driving and driven members in said cases, traction wheels, oscillatory axles between the driven members and said wheels, and means to guide said axles to oscillate in an approximately vertical plane.

10. In a running-gear for vehicles, a superimposed frame, oscillatory cases supported from said frame in offset relationship laterally of the vehicle, driving and driven members in said cases, traction wheels, oscillatory axles between the driven members and said wheels, means to guide said axles to oscillate in approximately vertical planes, and springs interposed between said frame and said axles.

11. In a running-gear for vehicles, a frame provided with hangers in offset relationship laterally of the vehicle, shafts journaled in said hangers, means to drive said shafts, oscillatory cases mounted between said hangers on said shafts, driving members secured to said shafts within said cases, driven members in said cases, traction wheels, and axles, arranged to oscillate in approximately vertical planes, between said driven members and said wheels.

12. In a running-gear for vehicles, a superimposed frame provided with hangers in offset relationship laterally of the vehicle, shafts journaled in said hangers, means to drive said shafts, oscillatory cases mounted in said hangers on said shafts, driving members secured to said shafts within said cases, driven members in said cases, traction wheels, and axles, arranged to oscillate in approximately vertical planes, between said driven members and said wheels, and springs between said frame and said axles.

13. In a running-gear for vehicles, a frame, a propeller line of shafting and intermediate shafts supported from said frame, means to drive said intermediate shafts from said shafting, oscillatory cases mounted on said intermediate shafts, driving members secured to said shafts within said cases, driven members in said cases, traction wheels, and oscillatory axles between said driven members and said wheels.

14. In a running-gear for vehicles, a frame, a propeller line of shafting, including a differential, and intermediate shafts supported from said frame, means to drive said intermediate shafts from said shafting, oscillatory cases mounted on said intermediate shafts, driving members secured to said shafts within said cases, driven members in said cases, traction wheels, and oscillatory axles between said driven members and said wheels.

15. In a running-gear for vehicles, a frame, a shaft and worm supported from said frame, a case mounted to oscillate on said shaft, said case enclosing said worm, means to drive said shaft, an oscillatory axle, a worm-wheel secured to said axle at the inner terminal thereof and intermeshing with said worm, said case also enclosing said worm-wheel, a traction wheel secured to said axle at the outer terminal thereof, and means to enable said axle to oscillate in an approximately vertical plane, said axle fulcruming through the medium of said worm-wheel on said shaft and with said case moving about the shaft.

16. In a running-gear for vehicles, a frame, a shaft and worm supported from said frame, a case mounted to oscillate on said shaft, said case enclosing said worm, means to drive said shaft, an oscillatory axle, a worm-wheel secured to said axle at the inner terminal thereof and intermeshing with said worm, said case also enclosing said worm-wheel, and a traction wheel secured to said axle at the outer terminal thereof, the construction and arrangement of parts being such that said axle is capable of moving about the axis of said worm, carrying with it said worm-wheel and case.

17. In a running-gear for vehicles, a frame, driving members supported from said frame, oscillatory axles arranged out of line with each other and extending from opposite sides of the center of the vehicle beyond such center, and each equipped at opposite terminals with a traction wheel and a member driven by one of said driving members, and yielding means to support said frame from said axles.

18. In a running-gear for vehicles, axles, traction wheels and driven elements secured to said axles at opposite terminals, a superimposed frame, resilient means to support said frame on said axles, and driving elements carried by said frame for said driven elements, the weight of said driving and driven elements being supported, without the intervention of said resilient means, by said frame, whereby the distances between centers of the driving and driven parts is unchanged by the movement of said frame on said resilient means.

19. In a running-gear for vehicles, axles, traction wheels secured to said axles at their outer terminals and driven elements secured to said axles at their inner terminals, a superimposed frame, resilient means to support said frame on said axles, and driving elements carried by said frame for said driven elements, said axles at their inner terminals being supported, without the intervention of said resilient means, by said frame, whereby the distances between the centers of the driving and driven parts are unchanged by the movement of said frame on said resilient means.

20. In a running-gear for vehicles, axles, traction wheels and driven elements secured to said axles at opposite terminals, a superimposed frame, resilient means to support said frame on said axles, driving elements carried by said frame for said driven elements, and cases carried by said frame for said driving and driven elements, the weight of said cases, with said driving and driven elements, and of said axles at their inner terminals being supported, without the intervention of said resilient means, by said frame, whereby the distances between centers of the driving and driven parts remain fixed regardless of the movement of said frame on said resilient means.

JAMES A. EDEN, Jr.